United States Patent [19]

Caplan

[11] Patent Number: 5,345,716
[45] Date of Patent: Sep. 13, 1994

[54] SEGMENTED MULTIPLE WIDTH STORM SHUTTER

[76] Inventor: Mark A. Caplan, 1701 Michigan Ave., Miami Beach, Fla. 33139

[21] Appl. No.: 124,336

[22] Filed: Sep. 20, 1993

[51] Int. Cl.⁵ ............................................. E05B 65/04
[52] U.S. Cl. ........................................ 49/61; 52/579; 49/464
[58] Field of Search ................... 49/57, 61, 50, 463, 49/464, 465; 52/202, 594, 595, 203, 579

[56] References Cited

U.S. PATENT DOCUMENTS

| 792,979 | 6/1905 | Fulghum | 52/594 X |
|---|---|---|---|
| 3,001,333 | 9/1961 | Piana | 52/595 X |
| 3,466,832 | 9/1969 | March | 52/594 X |
| 3,562,988 | 2/1971 | Gregoire | 52/594 X |
| 4,333,271 | 6/1982 | DePaolo et al. | 49/464 |
| 4,697,399 | 10/1987 | Ryan | 52/579 X |

FOREIGN PATENT DOCUMENTS

| 399702 | 3/1966 | Switzerland | 52/594 |
|---|---|---|---|
| 472199 | 9/1937 | United Kingdom | 52/579 |

*Primary Examiner*—Peter M. Cuomo
*Assistant Examiner*—Jerry Redman
*Attorney, Agent, or Firm*—Malin, Haley, DiMaggio & Crosby

[57] ABSTRACT

An improved storm shutter that is selectively constructed of a combination of individual modular elements, each of a different configuration and width that can be selectively joined side by side to form a rigid storm shutter of a desired width, eliminating the need to cut rigid panels to a precise width. This device is suitable for hurricane wind protection and can be fastened to the exterior of a building using conventional fasteners.

6 Claims, 2 Drawing Sheets

SEGMENTED MULTIPLE WIDTH STORM SHUTTER

BACKGROUND OF THE INVENTION

1. Field of the Invention

This invention relates to improved storm shutters that are useful to protect windows and doors on residential and commercial buildings in event of high winds and rains such as experienced in hurricanes or severe thunderstorms, and specifically to an improved storm shutter that can be constructed with modular segments of different widths which can fit together for providing multiple widths as required by windows of various widths without sacrificing strength.

2. Description of the Prior Art

Exteriorly mounted storm shutters for covering windows and doors on residential homes or commercial buildings are well known in the art. There are a variety of different types of storm shutters including those that can be rolled up and down covering the window or door opening, some that are rigid and installed in place just prior to the storm on mounting brackets near the window areas through the use of screws, fasteners or pegs, and rigid awning shutters that pivotally fold over the windows and are fastened in place to the exterior walls.

The use of corrugated, rigid aluminum sheets, each of which must be precut to the window width, as storm shutters in areas where hurricanes are experienced such as in Florida is well known. A one piece corrugated rigid aluminum sheet is typically mounted in a top track and a bottom ledge using clips or wedging pegs that are pounded into place, rigidly holding the corrugated aluminum panel over the window, covering the complete window area. Although these shutters have been proven to be very effective barricades to protect the window areas and door areas and cost effective, one drawback is that each aluminum sheet being a single piece must be custom cut in width because of the various sizes (widths) of different windows that may be involved even on a single dwelling.

The purpose of this invention is to provide a sturdy aluminum window or door storm shutter that is made up of individually sized modular segments that allows one to readily construct a window shutter that is basically custom fit in width without the extra labor of cutting each individual sheet to fit each individual window. The use of foldable and extruded strips is known in the prior art. U.S. Pat. No. 3,129,793 issued to Ferrell, Apr. 21, 1964 shows a sun shade panel having a plurality of equally sized corrugated panels. U.S. Pat. No. 3,283,455 issued to Riegelman, Nov. 8, 1966 shows a frame construction for multiple panels for covering doors. U.S. Pat. No. 4,333,271 issued to DePaolo et al., Jun. 8, 1982 shows hurricane panel construction using corrugated sheets. U.S. Pat. No. 2,680,886 issued to Urban, Jun. 15, 1954 shows a segmented awning used to cover a window as a plurality of individual strips. U.S. Pat. No. 3,948,308 issued to Facey, Apr. 6, 1976 shows a foldable storm window that can be made larger than the window area through a series of panels. U.S. Pat. No. 4,184,297 issued to Casamayor, Jan. 22, 1980 shows a plurality of plastic panels made in strips that is used as insulating panels in large windows. U.S. Pat. No. 4,514,945 issued to Menchetti, May 7, 1985 shows a window insulating system using a plurality of individual panels that can be held in place adjacent the window. U.S. Pat. No. 4,928,450 issued to Rutledge, May 29, 1990 shows a panel system for windows that allows individual panels to be fit over the windows. U.S. Pat. No. 5,099,904 issued to Susner, Mar. 31, 1992 shows a plurality of panels used with a foldable shutter. U.S. Pat. No. 5,155,936 issued to Johnson, Oct. 20, 1992 shows a sliding panel shutter assembly covering windows or doors. None of the references disclosed provide a storm shutter having a plurality of modular rigid, preferably aluminum, panels having different widths and configurations in a side-by-side array to custom fit a window with a sturdy, durable shutter for storm protection without having to individually cut a single panel.

SUMMARY OF THE INVENTION

A storm shutter that is sturdy and suitable for use on an exterior building for covering windows and doors to provide against wind, rain and flying object damage, the shutter being comprised of individual variably sized and configured, modular, metal extruded panels, each of which has connectors on one or both lateral edges for side-by-side attachment to other panels of varying size, to provide a custom width window fit for a particular window.

In one embodiment, a total of four differently sized and configured shutter panel segments of different cross-sectional designs or configurations and different widths are used to construct several individual storm shutters of different desired widths. Two modular panel segments act as end members, and two act as intermediate panel segments. The finished shutter will include a plurality of trapezoidally-shaped sections when joined together in a side by side continuous array as one sturdy shutter, giving the shutter a corrugated appearance. However, each of the four individual modular panel segment configurations are each different. By selecting a variety of modular panels, various window and door shutters of different widths can be custom fit to different sized windows.

The first modular panel segment is a single flat piece of metal of a predetermined width that defines one top section of the trapezoidal cross section configuration. This single flat segment includes two female C-shaped connectors, one along each lateral edge, which allow each flat panel segment to be interconnected into adjacent panels having male C-shaped or cylindrical connectors for side by side panel interlocking engagement. The opening of the C-shaped connectors is the same size as the wall thickness of each panel to insure a snug fit when interlocked so that adjacent panels cannot pivot relating to each other.

The second modular panel segment is a single sheet configured with two flat walls disposed at an acute angle between them that forms one-half of the trapezoidal cross section. One lateral edge includes a male C-shaped or round connector having a radius smaller than the inside radius of the female C-shaped connectors to allow interlocking of the male and female connectors between adjacent modular panel segments. The other lateral edge includes an angled flange that prevents lateral movement of the shutter when engaged near a mounting clip used to hold the shutter in place.

The third modular panel segment is trapezoidally-shaped in cross section with two flat sidewalls angularly integrally formed with another flat wall that represents the top wall of a trapezoid, all of which are formed as a single unit. Both lateral edges contain smaller radius, male cylindrically-shaped or C-shaped connectors for interlocking the lateral edges with adjacent panel segments.

The fourth modular panel segment used to form a finished custom fit shutter can include two flat parallel walls spaced apart by an integrally manufactured oblique flat wall. The panel segment has a larger female C-shaped connector along one lateral edge for interlocking with an adjacent panel or segment into the smaller male cylindrical or C-shaped connector. The other lateral edge includes an angled flange that forms the shutter end edge that cooperates with a clip fastener or wedge fastener on a separate mounting rail to prevent lateral shutter movement once mounted on an exterior building wall.

Using any combination and multiples of these four modular panel segments of different widths and configurations, a single rigid interlocked custom fit shutter can be constructed on site having the proper width required for any individual window or door using a combination of these four interlocking module panel segments. Once the window to receive a shutter is selected, an array of modular segments can be selected to produce the desired window covering. A small overlap of the shutter ends relative to the window is desirous, which can be readily obtained using the connectable modular segments. The panel segments are locked together by longitudinally sliding lateral edge connectors together, interlocking the desired adjacent panel segments side by side, until the overall desired shutter width is obtained. Once the combinations of panel segments have been selected and connected together, the shutter is ready to be mounted in a conventional manner to the building exterior, over the window or door. A conventional top U-shaped track fastened to the exterior building wall above the window opening receives the top edge of the shutter. The bottom shutter edge is mounted on a T-shaped bracket, having openings, fastened to the exterior wall. The bracket openings receive spring clips or wedge fasteners spaced at intervals to hold the bottom portions of the shutter in place.

Although extruded aluminum can be used in the present invention, other metal alloys or plastic (extruded) can be used in a similar configuration of panel segments for disposition together to form one individual shutter. Thus, any building window, whether residential or commercial, of any width can be covered by selecting from four modular panel segments for assembly into a shutter that is rigid and sturdy. In the present invention, storm shutters fabricated from standard aluminum panel segments can be easily and readily assembled to the proper desired width, greatly reducing the cost of construction.

It is an object of this invention to provide an improved storm shutter that can be constructed in any desired width without independently cutting each shutter to custom fit each window or door, greatly reducing cost.

It is another object of this invention to provide an improved individual storm shutter for removable mounting on an exterior building wall for covering windows and doors, each shutter being made from a combination of a plurality of individual modular panel segments of varying widths and configurations that are manually attached side by side to fit any window or door width.

And yet it is another object of this invention to provide a sturdy storm shutter made up of individually extruded panel components that can be selectably chosen for a shutter custom fit, easily attached to each other, side-by-side for producing a shutter of any desired width, eliminating the labor and expense of the cutting of single sheets.

In accordance with these and other objects which will become apparent hereinafter, the instant invention will now be described with particular reference to the accompanying drawings.

DESCRIPTION OF THE PREFERRED EMBODIMENTS

Figure 1:
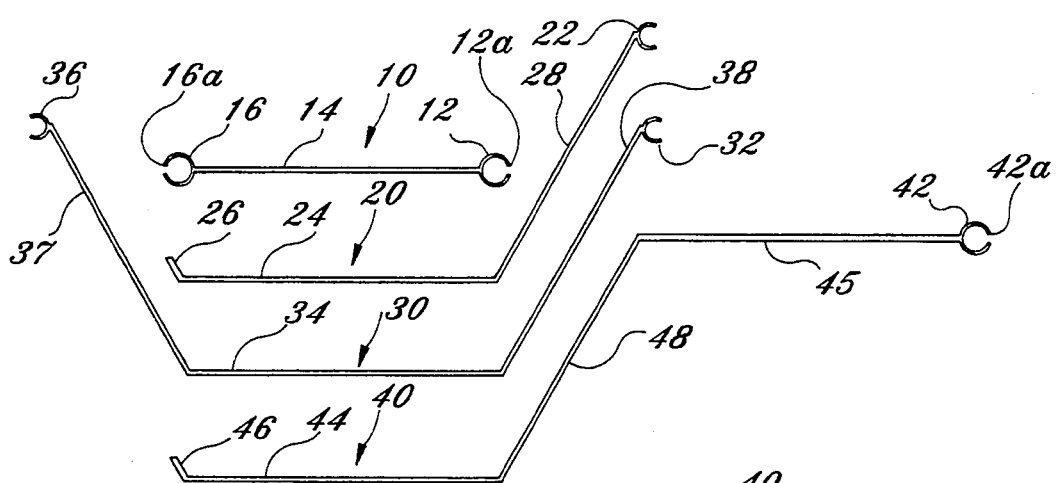
FIG. 1 shows a top plan cross-sectional view, illustrating a variety of shutter panel segments used of different widths and configurations that can be combined for use as the present invention.

Referring to the drawings, FIG. 1 shows four panel segments of different widths and shapes which constitute modular segments of extruded metal (preferably aluminum or other strong alloy or plastic) having one or more flat surfaces with connectors and/or flanges on lateral edges. By selecting a combination of panel segments shown, a storm shutter can be constructed of any desired width for covering a door or window. Standard lengths can be made for each panel segment.

In the preferred embodiment, four different panel segments are employed. The first panel segment is a flat, thin rigid panel segment 10 made of extruded aluminum having disposed along both lateral edges longitudinally C-shaped female connectors 12 and 16. The openings of the larger C-shaped female connectors 12a, 16a, and 42a are substantially equal to the thickness of each panel segment 10, 20, 30, and 40 for a snug fit so that adjacent panel segments do not move or pivot relative to each other.

A second panel segment 20 is shown that has two flat surfaces 24 and 28 which are rigid aluminum, extruded as one unitary piece, at an acute inside angle, and having a C-shaped male connector 22 on one lateral edge longitudinally with a flange 26 at the opposite lateral edge. The outside radius of connector 22 is smaller than the inside radii of connectors 12, 16, and 42, such that the male connector 22 fits inside connectors 12, 16, and 42 to interlock adjacent panel segments together. The flange 26 protrudes from the lateral edge at approximately a 45° angle with surface 24 and is used to prevent lateral movement when the shutter is attached to a wall with spring clips. The second segment 20 is used as an end panel segment for each shutter as is panel segment 40 in view of flanges 26 and 46.

The third panel segment 30 is a partial trapezoidally-shaped, three walled metal sheet having three flat walls 34, 37 and 38 unitarily formed at acute angles, the walls forming the overall shape of a trapezoid with no base.

Two male, C-shaped connectors 32 and 36 are provided along opposite lateral edges. Male connectors 32 and 36 can interlock and fit inside connectors 12, 16, and 42 on the other panel segments.

The fourth panel segment 40 acts as a shutter end piece and has three flat walls 44, 45 and 48, walls 44 and 45 being parallel while flat wall 48 (of equal length) is integrally formed at acute angles to walls 44 and 45. One lateral edge includes a C-shaped female connector 42, while the opposite and parallel lateral edge includes flange 46 which is used with spring clip fasteners or wedges to prevent lateral movement of the shutter. The flange 46 protrudes from the lateral edge at approximately 45° angle with respect to its segment 18.

Figure 4:
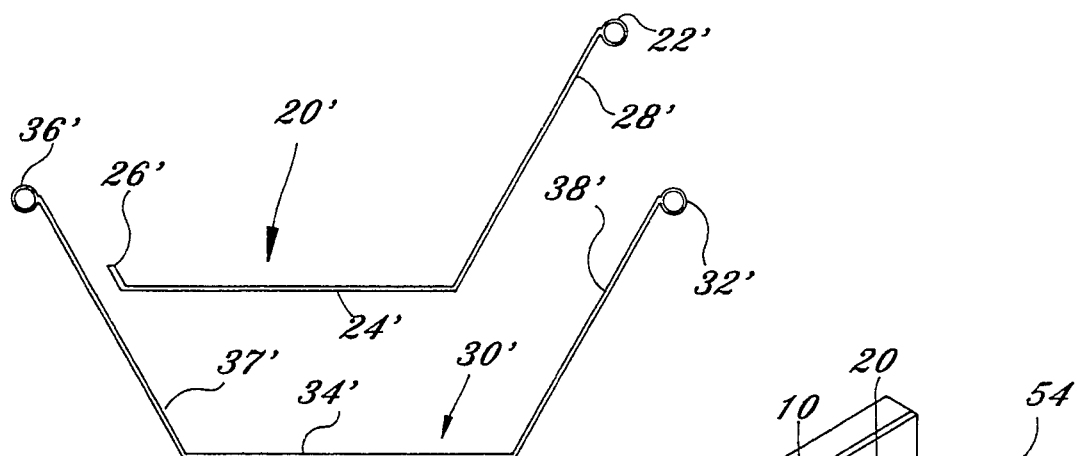
FIG. 4 shows a top plan view in cross section of an alternative embodiment of the instant invention illustrating panel segments having male cylindrical connectors along one lateral edge.

In an alternative embodiment shown in FIG. 4, the male connectors 22', 32', and 36' on panel segments 20' and 30', respectively, comprise a solid cylindrical rod of smaller radius than the inner radius of female C-shape connectors 12, 16, and 42. The cylindrical connectors 22', 32', and 36' interlock and fit inside with the female C-shaped connectors to connect adjacent panel segments.

A storm shutter for a particular window (or door) can be individually created by selectively using a combination of two or more of the panel segments shown in FIGS. 1 and 4, varied to provide a specific width for the window or door. Each panel segment is made in one or more standard lengths. The panel segments are connected by joining the larger C-shaped female connectors, such as 12, 16, or 42 with the smaller radius male connectors 22, 32, or 36, which are manually moved longitudinally into the female connectors to join together adjacent panel segments. Two panel segments are joined side by side in a rigid fashion and do not pivot due to the small openings of each fastener 12a, 16a, and 42a which are just large enough to receive the thickness of the adjacent panel wall segment near connector 12, 16, or 42. This ensures rigidity across the width of the storm shutter structure when the panel segments are joined together side-by-side. In the alternative embodiment cylindrical male connectors 22', 32', and 36' may be similarly rigidly mated with the C-shaped connectors 12, 16, and 42.

Figure 2:
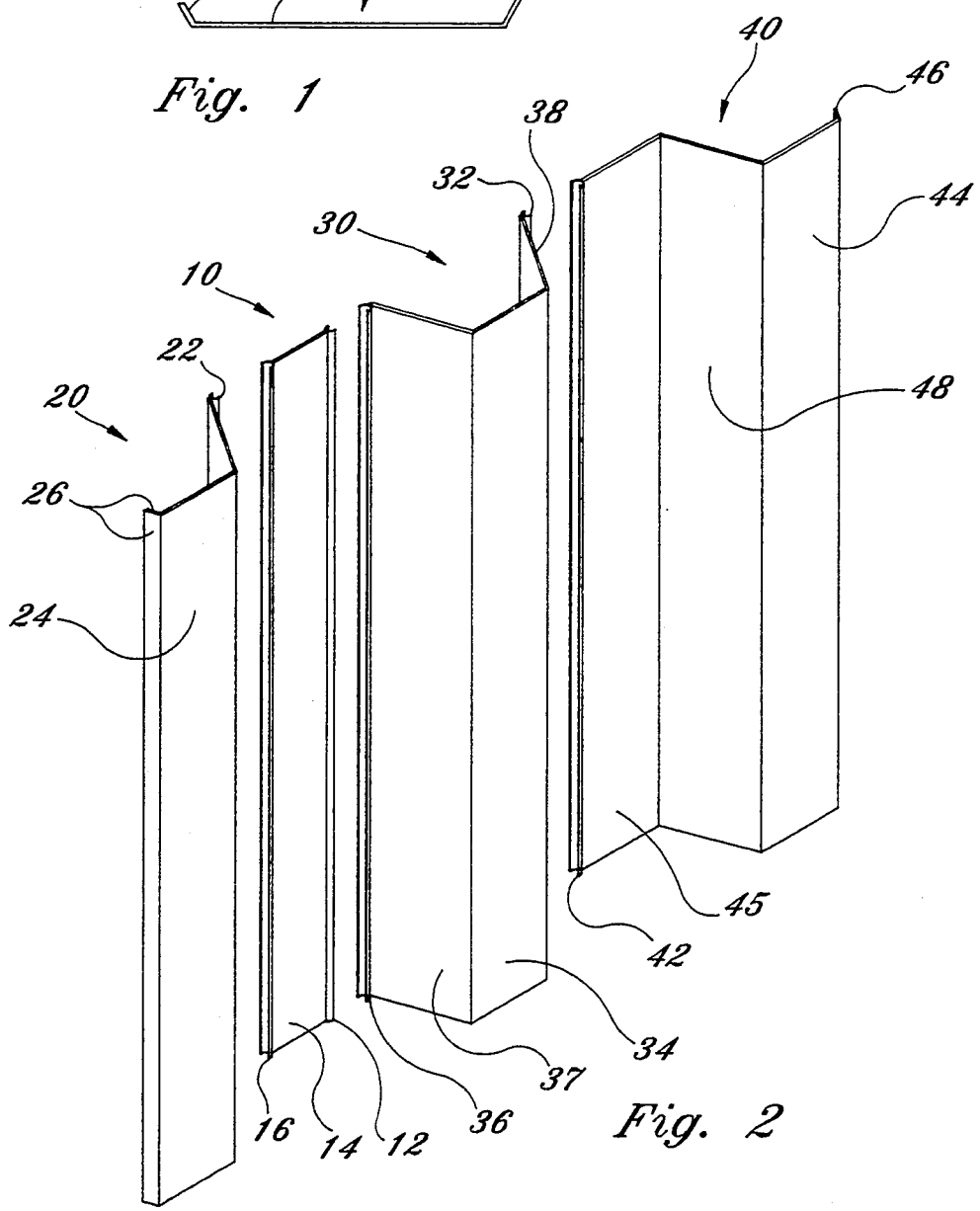
FIG. 2 shows an exploded perspective view of the individual panel segments used to form a shutter in accordance with the present invention.

FIG. 2 shows each of the panel segments 10, 20, 30 and 40 in an exploded view but representative of attaching each one of them side by side to form a specific shutter panel of a defined width while viewing the back side of the shutter. Note that the overall effect when joined together provides a corrugated look of alternating trapezoids for rigidity, similar to integral, one piece, corrugated panels shown in the prior art.

The configuration shown in FIG. 2, however, is just representative of one specific embodiment for a particular width and would differ for different widths by substitution of one or more additional panel segments where appropriate to achieve any desired width.

Figure 3:
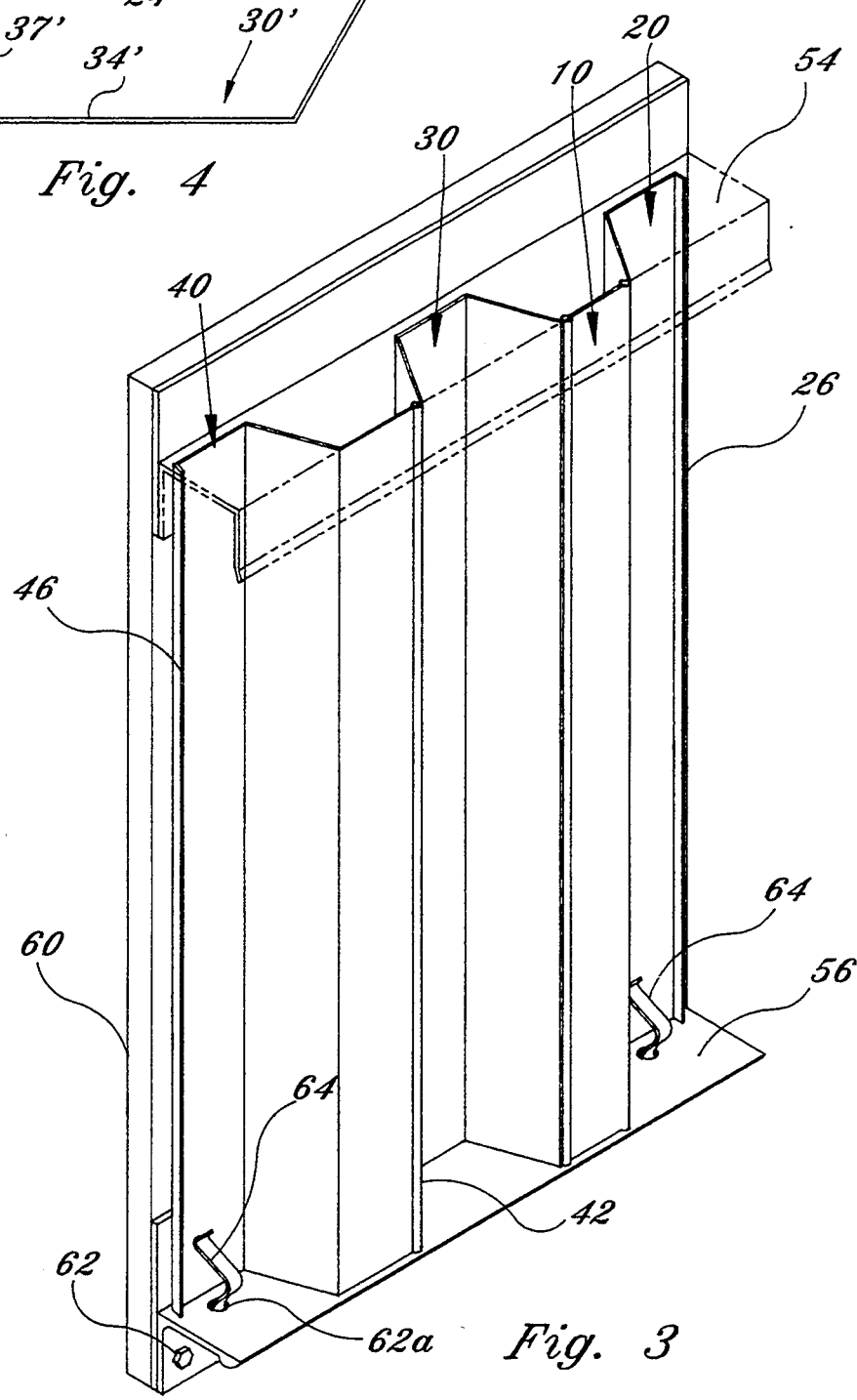
FIG. 3 shows a finished storm shutter made up of individual panel segments disposed to cover a conventional window, in perspective.

FIG. 3 shows a storm shutter formed of all four panel segments 10, 20, 30, and 40, joined together. Once connected, the entire shutter is mounted into an upper U-shaped track 54 and mounted on a T-shaped bracket 56 fastened to exterior building wall 60 by bolt 62. Spring clips 64 mounted through each opening 62a hold the shutter in place near the edge flanges 46 and 26 which prevent lateral movement of the shutter. Different combinations of panel segments will be employed based on the desired width.

The shutters are selectively constructed such that the shutter body terminates at each lateral edge with either flange 26 or flange 46.

The shutters described herein in this invention can be utilized to withstand great rain and wind and flying object damage that can meet most area building codes throughout the United States. The panel segments can be delivered to a site as the various segments shown. The segments are selected at site for constructing each storm shutter for each window without individually cutting wide sheets in a standard format.

The panel segments described herein have been shown to be made of extruded metal, preferably aluminum or other desirable strong alloy, but could also be made from extruded plastic. The lateral edge panel segment connectors also have been shown as either C-shaped passages or cylindrical-shaped connectors that fit within the C-shaped passages. Other fastening means could be used, such as snap-lock, with predisposed expandable paired flanges that allow adjacent panels to be snap-locked together.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A storm shutter for mounting on an exterior portion of a building to protect window or door openings from high winds, flying foreign objects and rain, said storm shutter constructed of a plurality of individual modular segments to achieve any desired width for a custom fit on any window width comprising:

first flat panel segment of a first width having first and second connecting means disposed along lateral edges;

second panel segment of a second width different than said first width of said first panel segment including third connecting means along one lateral edge connectable to said first panel segment first connecting means, each of said first and second panel segments being rigid, said second panel being of a different shape than said first panel in cross-sectional configuration whereby the first and second panels can be joined together to form a storm shutter;

third rigid panel segment having fourth and fifth connecting means disposed along lateral edges, said fist and second connecting means being engagable with said third connecting means, said fourth connecting means, and said fifth connecting means, whereby the first, second and third panel segments are joined together in different relationships to form a single rigid storm shutter panel of varying widths to fit a particular window;

a fourth rigid panel segment including an elongated body having a first lateral edge and a second lateral edge and a sixth connecting means disposed along the first lateral edge;

said third rigid panel segment having a flat portion and a pair of oblique angled portions connected at acute angles relative to said flat portion, forming a trapezoidal shape without a base, said second panel segment including a first flat portion and a second flat portion disposed at an obtuse angle relative to each other, and said fourth panel segment having first and third flat sections parallel to each other and connected by a second flat section disposed at an obtuse angle to each parallel panel, whereby a combination of panel segments are joined together forming what appears to be a trapezoidally-corrugated rigid panel for use as a shutter.

2. A storm shutter as recited in claim 1, wherein each of said first and second connecting means is a substantially C-shaped female connector.

3. A storm shutter as recited in claim 1, wherein each of said third connecting means, said fourth connecting means, and said fifth connecting means is a substantially C-shaped male connector.

4. A storm shutter as recited in claim 1, wherein each of said third connecting means, said fourth connecting means, and said fifth connecting means is a substantially cylindrical rod.

5. A storm shutter as recited in claim 1, wherein said second panel segment includes a flange means disposed along another lateral edge for preventing lateral movement of the shutter when the shutter is mounted on an exterior building wall.

6. A storm shutter as recited in claim 1, wherein said fourth panel segment includes a flange means disposed along said second lateral edge for preventing lateral movement of the shutter when the shutter is mounted on an exterior building wall.

* * * * *